US010801843B2

(12) United States Patent
Zhu et al.

(10) Patent No.: US 10,801,843 B2
(45) Date of Patent: Oct. 13, 2020

(54) INDOOR MOBILE ROBOT POSITION AND POSTURE MEASUREMENT SYSTEM BASED ON PHOTOELECTRIC SCANNING AND MEASUREMENT METHOD

(71) Applicant: Tianjin University, Tianjin (CN)

(72) Inventors: Jigui Zhu, Tianjin (CN); Yongjie Ren, Tianjin (CN); Linghui Yang, Tianjin (CN); Jiarui Lin, Tianjin (CN); Zhe Huang, Tianjin (CN)

(73) Assignee: Tianjin University, Tianjin (CN)

( * ) Notice: Subject to any disclaimer, the term of this patent is extended or adjusted under 35 U.S.C. 154(b) by 213 days.

(21) Appl. No.: 15/749,089

(22) PCT Filed: May 27, 2016

(86) PCT No.: PCT/CN2016/083607
§ 371 (c)(1),
(2) Date: Jan. 30, 2018

(87) PCT Pub. No.: WO2017/020641
PCT Pub. Date: Feb. 9, 2017

(65) Prior Publication Data
US 2018/0216941 A1 Aug. 2, 2018

(30) Foreign Application Priority Data
Jul. 31, 2015 (CN) .......................... 2015 1 0467525

(51) Int. Cl.
*G01C 21/20* (2006.01)
*G01C 21/00* (2006.01)
(Continued)

(52) U.S. Cl.
CPC .......... *G01C 21/206* (2013.01); *G01C 21/00* (2013.01); *G01S 5/16* (2013.01); *G01S 5/163* (2013.01);
(Continued)

(58) Field of Classification Search
None
See application file for complete search history.

(56) References Cited

U.S. PATENT DOCUMENTS 5,005,128 A * 4/1991 Robins .................... G01S 17/06
180/167
5,100,229 A * 3/1992 Lundberg ............. G01C 15/002
356/3.12

(Continued)

FOREIGN PATENT DOCUMENTS

CN 102305923 A * 1/2012
CN 105700522 A * 6/2016

OTHER PUBLICATIONS

CN 105700522 A—Translation (Year: 2016).*
CN 102305923 A—Translation (Year: 2012).*

*Primary Examiner* — Lina M Cordero
(74) *Attorney, Agent, or Firm* — George G. Wang; Bei & Ocean

(57) ABSTRACT

An indoor mobile robot position and posture measurement system based on photoelectric scanning and the measurement method thereof, the measurement system includes: a mobile robot (1) which is arranged with a laser transmitter (2), the peripheral of the laser transmitter (2) is provided with no less than three receivers (3) for receiving the light signals emitted by the laser transmitter (2), and at least one signal processor (4) connected to the receivers (3) for processing signals received by the receivers (3) to determine precise coordinates of the receivers in laser transmitter coordinate system, and a terminal computer (5) wirelessly connected with the signal processor (4) to determine the posture angle and the position of the mobile robot through the distances between the laser transmitter (2) and each receiver (3). Without arranging multiple transmitters when measuring and performing tedious global orientation, the (Continued)

operators by using the measurement system and the measurement method of the present invention may measure the 3D position and posture of the indoor mobile robot in real time by multiple guidance signals consisting of photoelectric receiver and a high-speed laser scanning turntable fixed on the mobile robot.

7 Claims, 6 Drawing Sheets

(51) Int. Cl.
    *G01S 5/16*     (2006.01)
    *G05D 1/02*     (2020.01)
    *G01S 11/12*     (2006.01)
    *G01S 17/06*     (2006.01)

(52) U.S. Cl.
    CPC ............... *G01S 11/12* (2013.01); *G01S 17/06* (2013.01); *G05D 1/0242* (2013.01); *G05D 1/0282* (2013.01); *G05D 1/024* (2013.01); *G05D 1/0236* (2013.01)

(56) References Cited

U.S. PATENT DOCUMENTS

| | | | | |
|---|---|---|---|---|
| 5,467,273 A * | 11/1995 | Faibish | ................... | G01S 17/06 |
| | | | | 180/169 |
| 8,315,737 B2 * | 11/2012 | Hyung | ................. | G05D 1/0272 |
| | | | | 700/251 |
| 2008/0009974 A1 * | 1/2008 | Kong | ........................ | G01S 5/30 |
| | | | | 700/258 |
| 2009/0093907 A1 * | 4/2009 | Masaki | .................. | G05D 1/024 |
| | | | | 700/248 |
| 2011/0279366 A1 * | 11/2011 | Lohbihler | ............ | G01S 5/0247 |
| | | | | 345/157 |

\* cited by examiner

INDOOR MOBILE ROBOT POSITION AND POSTURE MEASUREMENT SYSTEM BASED ON PHOTOELECTRIC SCANNING AND MEASUREMENT METHOD

FIELD OF THE INVENTION

The invention relates to an indoor mobile robot position and posture measurement method, and more particularly relates to an indoor mobile robot position and posture measurement system based on photoelectric scanning and measurement method.

BACKGROUND OF THE INVENTION

Indoor mobile robots, such as automatic guided vehicle (AGV) and movable processing platform, have been widely used in the in-situ assembly of industrial large components. When operates, operators need to real-time measure the positions and postures of the components to be assembled. At present, the 3D coordinate and posture measurement method are mainly divided into two types: dead reckoning and absolute positioning method. Dead reckoning method uses internal sensors such as odometer and gyroscope to determine the distance and direction of robot corresponding to the initial position and posture so as to calculate the final posture of robot; whereas, absolute positioning method mainly adopts beacon guidance, offence/defense flag, map matching or GPS for position and posture measurement. In comparison, dead reckoning can independently measure data without peripheral equipment, which makes the robot and the measuring system into an overall design, thus can continuously and stably output the position and orientation information of the robot without any disturbance to the environment outside the system. However, as the dead reckoning is mostly based on integral operations, the measurement errors will be magnified with the accumulation of time, and data drifts will exist therein; the absolute positioning method usually arranges a plurality of transmitting base stations and receivers in space, and takes the receivers as the detection targets; the transmitting base stations transmit signals in various forms, such as light, sound, electromagnetic, etc., to the space to be measured, and the receivers receive and process the signals, and then convert them into self position and orientation information based on different physical principles, or directly reflect the signals back to the transmitting base stations for processing by the transmitting terminal. The absolute positioning method normally has high accuracy and stability because its measurement accuracy is irrelevant to time, and no error accumulation and data drift exists therein. However, in order to ensure the mobile robot running efficiently and smoothly under wide work area and complex missions, it is necessary to install a plurality of transmitting base stations in the workspace to guarantee the measurement range, thus the requirements to the in-situ environment are high. Furthermore, when measuring the fields, the establishment of coordinate system and the global positioning among transmitting base stations are relatively complicated.

SUMMARY OF THE INVENTION

The present invention is used in industrial environments where multiple base stations intersection measurements cannot be realized, and the objects of the present invention is to provide an indoor mobile robot position and posture measurement system based on photoelectric scanning and measurement method.

The technical scheme of the present invention is as follows:

An indoor mobile robot position and posture measurement system based on photoelectric scanning, including a mobile robot which is arranged with a laser transmitter, the peripheral of the transmitter is provided with no less than three receivers for receiving the light signals emitted by the laser transmitter, and at least one signal processor connected to the receivers for processing signals received by the receivers to determine precise coordinates of the receivers in laser transmitter coordinate system, and a terminal computer wirelessly connected with the signal processor to determine the posture angle and the position of the mobile robot by determining the distances between the transmitter and each receiver.

Each signal processor connects with 3 to 8 receivers.

A measurement method of the indoor mobile robot posture measurement system based on photoelectric scanning, includes:

Step 1: establishing global navigation coordinate system, precisely measuring the 3D coordinates of each receiver in global navigation coordinate system by a laser tracker or an indoor GPS (Global Positioning System);

Step 2: receiving, by each receiver, a scanning laser signal emitted by an infrared laser of the laser transmitter and the synchronous pulse laser signal emitted by the synchronous pulse laser, and sending the signals to each connected signal processor; calculating, by each signal processor, precise coordinates of each connected receiver in the laser transmitter coordinate system, including two scanning angles $\theta_{i1}$, $\theta_{i2}$ and the horizontal angle $\alpha_i$ and vertical angle $\beta_i$ the receiver corresponding to the laser transmitter coordinate system, and storing the results into the terminal computer;

Step 3: calculating, by the terminal computer, the distance values between the laser transmitter and each receiver according to the precise coordinates of each receiver, respectively;

Step 4: expressing the approximate coordinates of each receiver in the laser transmitter coordinate system as $p_i = d_i (\cos \beta_i \cos \alpha_i, \cos \beta_i \sin \alpha_i, \sin \beta_i)$, and by taking the approximate coordinates as iteration initial value, performing optimal calculation to obtain the precise coordinates of each receiver in the laser transmitter coordinate system;

Step 5: performing coordinates conversion according to the precise coordinates achieved by step 4 and the 3D coordinates of all the receivers achieved by step 1 to obtain a posture matrix and a translation matrix of the laser transmitter coordinate system corresponding to the global navigation coordinate system;

Step 6: acquiring the posture angle of the mobile robot according to the posture matrix and acquiring the position of the mobile robot according to the translation matrix.

Wherein, two scanning angles $\theta_{i1}$, $\theta_{i2}$ and the horizontal angle $\alpha_i$ and vertical angle $\beta_i$ in step 2 are obtained by the following formulae:

$$\theta_{i1} = \omega \cdot t_{i1}$$

$$\theta_{i2} = \omega \cdot t_{i2}$$

$$l_i = n_{i1} \times n_{i2} = (r_{ix}\ r_{iy}\ r_{iz})$$

-continued $$\alpha_i = \arctan\left(\frac{r_{iy}}{r_{ix}}\right)$$

$$\beta_i = \arctan\left(\frac{r_{iz}}{\sqrt{r_{ix}^2 + r_{iy}^2}}\right)$$

Wherein, ω represents a rotational angular velocity of the rotor of the laser transmitter; $t_{i1}$ and $t_{i2}$ represent the time lengths when the first and second light-plane of the laser transmitter scan the $i^{th}$ receiver, respectively; $n_{i1}$ and $n_{i2}$ represent the normal vectors of the light-planes when the first and second light-plane of the laser transmitter scan the $i^{th}$ receiver, respectively, the cross multiply algorithm results $l_i$ thereof are expressed by ($r_{ix}$ $r_{iy}$ $r_{iz}$).

The distance values, which are calculated in Step 3, between the laser transmitter and each receiver may be obtained by the following formula achieved by arbitrary two receivers:

$$\cos(\theta_{ij}) = \frac{d_i^2 + d_j^2 - L_{ij}^2}{2 d_i d_j}$$

If no less than three receivers receive the laser signals, three formulae according to the above formula can be obtained, and the number of unknown values is equal to that of the formulae, so that the distances $d_i$ respectively between the transmitter and the three receivers may be calculated, 1=1,2,3. Wherein, $\theta_{ij}$ represents an included angle between the laser transmitter and a connecting line of the two receivers i, j, which can be obtained by the following formula:

$$\theta_{ij} = \arccos\left(\frac{l_i \cdot l_j}{|l_i| \cdot |l_j|}\right)$$

The posture matrix and the translation matrix in Step 5 may be obtained by:

$$[C_b^n T_b^n] = G \cdot S^T \cdot (S \cdot S^T)^{-1}$$

Wherein, $C_b^n$ represents the posture matrix, $T_b^n$ represents the translation matrix, assuming i receivers receiving the light signals from the laser transmitter; G and S represent the 3D coordinates point matrixes of the receivers in the global navigation coordinate system and the laser transmitter coordinate system, respectively, which can be expressed as:

$$G = \begin{bmatrix} P_1^n & P_2^n & \cdots & P_i^n \\ 1 & 1 & \cdots & 1 \end{bmatrix}$$

$$S = \begin{bmatrix} P_1^b & P_2^b & \cdots & P_i^b \\ 1 & 1 & \cdots & 1 \end{bmatrix}$$

Then the least-square problem is calculated to obtain the final results of $C_b^n$ and $T_b^n$ as follows:

$$\begin{cases} \min F = \sum_{i=1}^{N} \| P_i^n - [C_b^n T_b^n] \cdot P_i^b \|^2 \\ C_b^{nT} C_b^n - I = 0 \end{cases}$$

The posture angle of the mobile robot in Step 6 is obtained by the posture matrix obtained in Step 5, the formulae are as follows:

$$\psi = \arctan\left(\frac{C_b^n(1,2)}{C_b^n(2,2)}\right)$$

$$\theta = \arctan(C_b^n(3,2))$$

$$\gamma = \arctan\left(-\frac{C_b^n(3,1)}{C_b^n(3,3)}\right)$$

Wherein, ψ represents a heading angle, θ represents a pitch angle, and γ represents a roll angle.

The position of the mobile robot in Step 6 is obtained by the translation matrix directly, the translation matrix $T_b^n$ may be expressed as:

$$T_b^n = (X\ Y\ Z)$$

The components of the translation matrix are the 3D coordinates of the mobile robot in the global coordinate system.

The indoor mobile robot posture measurement system based on photoelectric scanning and the measurement method in the present invention have the advantages of high accuracy, high efficiency and convenience. Without arranging multiple transmitters when measuring, and performing tedious global orientation the operators may measure the 3D position and posture of the indoor mobile robot in real time by multiple guidance signals consisting of photoelectric receivers and a high-speed laser scanning turntable fixed on the mobile robot. The present invention has the advantages of:

1. Simple structure, the system in the present invention is based on the working principle of a single mobile measuring base station and a guiding beacon, which saves costs, simplifies operating steps compared with the existing measurement system;

2. High accuracy, coordinate measurement error of the system is less than 3 mm, measurement error of the posture angle is less than 0.1°, the accuracy of the present invention is much higher than that of other measurement systems based on the guiding beacon such as laser radar;

3. Less affection to the in-situ environment: due to its small size, the receivers, as a pilot beacon, can be placed in any location with good visibility conditions based on actual measurement requirements. Besides, the transmitter fixed on the robot adopts full-space rotary scanning mode, which allows the 360-degree viewing detection and extents the placement requirements of the receivers.

In which:

| | |
|---|---|
| 1: mobile robot | 2: laser transmitter |
| 3: receiver | 4: Signal processor |
| 5: terminal computer | 21: light-plane |
| 22: rotation axis | 23: rotor |
| 24: synchronous pulse laser | 25: base |
| 26: infrared laser | 27: housing of the receiver |
| 28: photosensitive center of the receiver | |

DETAILED DESCRIPTION OF THE EMBODIMENTS

The present invention will be further described accompanying with the figures.

Based on the precise 3D coordinates of each guiding beacon in the global navigation coordinate system, the present invention uses a small high-speed rotating platform as the transmitter and a plurality of guiding beacons to measure the position and posture of the transmitter by considering the precise parameter of which and measuring the spatial scanning angle of the transmitter corresponding to the respective guiding beacon.

In the present invention, the small high-speed rotating platform (acts as the transmitter) capable of transmitting laser signals to the whole space is fixed on the body of the mobile robot, so that the transmitter can continuously transmit laser signal to the workspace in the way of scanning while following the mobile robot to move. Meanwhile, the multiple guiding beacons (acts as receivers) are distributed at the working areas that can be detected by the transmitter. When the laser signals emitted by the transmitter scan the guiding beacons, the photoelectric sensors inside the beacons convert the laser signal into the electrical signal, and the electric signals are converted into the scanning angle information by the subsequent processing. The present invention takes the scanning angles as the basic observations, and finally optimized solving the 3D coordinates and posture angle of the transmitter in the global navigation coordinate system according to the parameters of the transmitter and the precise coordinates of the guiding beacons in the global navigation coordinate system.

Figure 1:
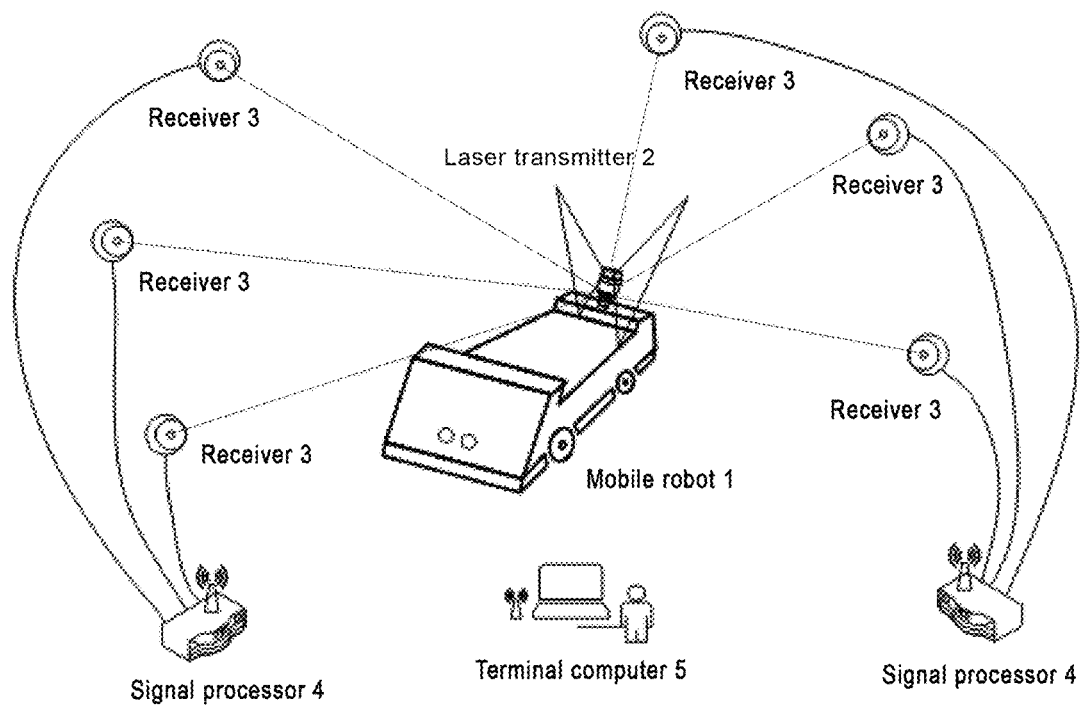
FIG. 1 is the schematic diagram of the indoor mobile robot position and posture measurement system based on photoelectric scanning and measurement method.
Figure 2:
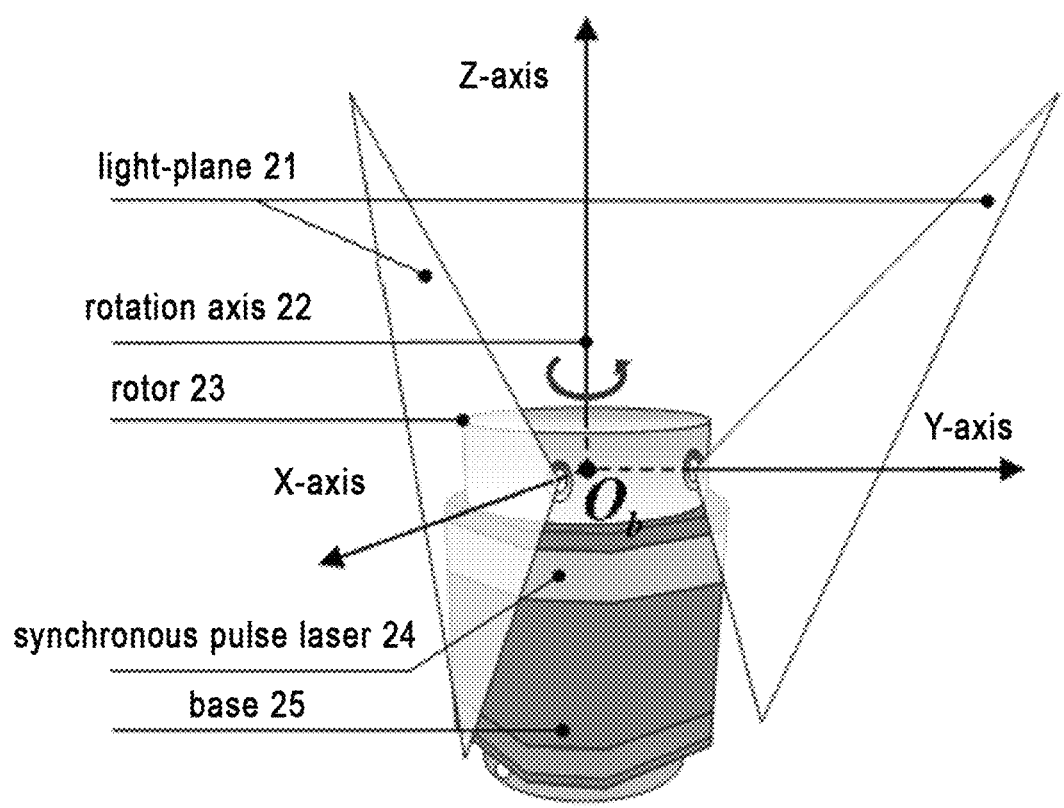
FIG. 2 is the schematic diagram of the structure of the laser transmitter of the present invention.
Figure 3:
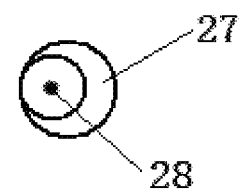
FIG. 3 is the schematic diagram of the structure of the receiver in the present invention.
Figure 4:
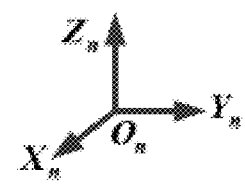
FIG. 4 shows the global navigation coordinate system.
Figure 5:
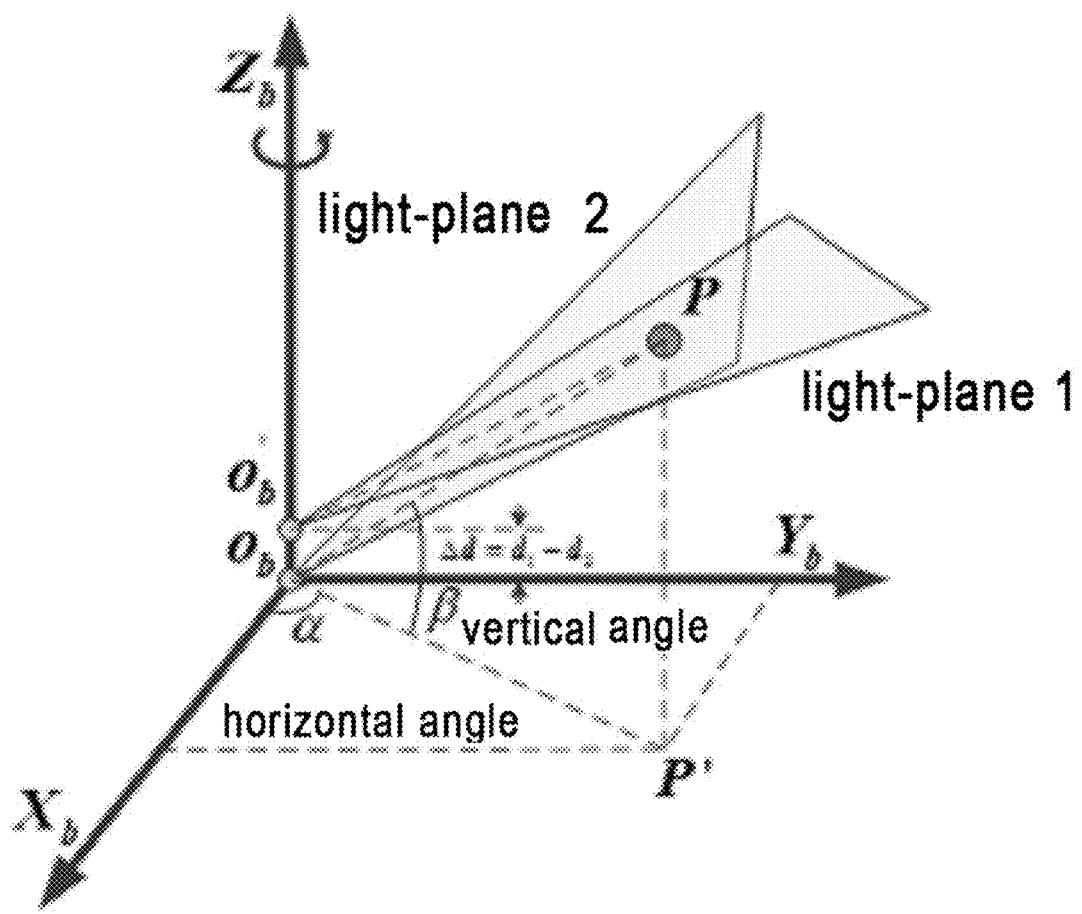
FIG. 5 shows the laser transmitter coordinate system.
Figure 6:
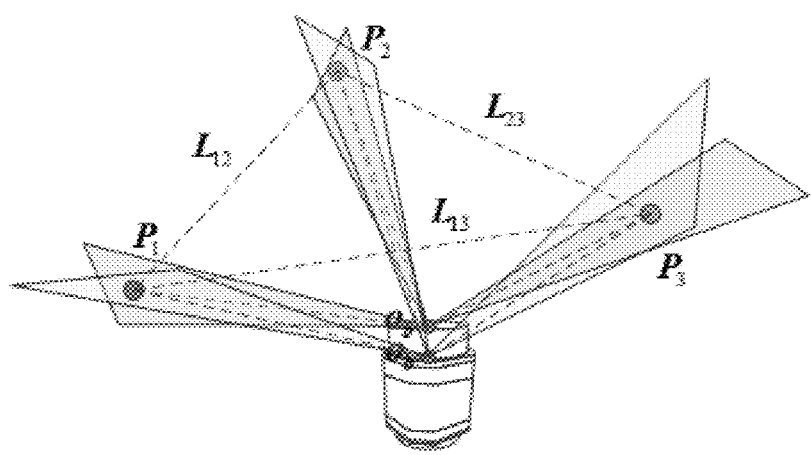
FIG. 6 shows the coordinates to be solved.

As shown in FIG. 1 and FIG. 2, the indoor mobile robot position and posture measurement system based on photoelectric scanning in the present invention, including a mobile robot 1 which is arranged with a laser transmitter 2, the peripheral of the laser transmitter 2 is provided with no less than three receivers 3 for receiving the light signals emitted by the laser transmitter 2, and at least one signal processor 4 connected to the receivers 3 for processing signals received by the receivers 3 to determine the precise coordinates of the receivers 3 in laser transmitter coordinate system, and a terminal computer 5 wireless connected with the signal processor 4 to determine the posture angle and the position of the mobile robot by determining the distances between the laser transmitter and each receiver. Each signal processor 4 connects with 3 to 8 receivers 3.

The laser transmitter 2 and the receivers 3 employ the structure disclosed in Chinese application No. 201210126759.5. Wherein:

As shown in FIG. 2, the laser transmitter mainly comprises a base 25 and a rotor 23; the rotor 23, which is rotatable at a high-speed, is arranged at the top of the laser transmitter, and two linear infrared lasers 26 are mounted on the rotor so as to obtain two fan-shaped infrared laser planes which can be scanned at high speed to the space to be measured; a circular synchronous pulse laser 24 is arranged on the base, and may emit pulse laser when the rotor rotates around a preset position to form a timing reference. In this way, the receivers receive the synchronous pulse laser and fan-shaped scanning laser so as to measure the rotation angles $\theta_{i1}$ and $\theta_{i2}$ of the rotor when the scanning laser scans the receiver, and measured data may be used as the basic observation for the subsequent calculation.

As shown in FIG. 2, fast photosensitive devices, such as PIN photodiodes or avalanche photodiodes, are selected as sensors for converting the light signals from the base into photocurrent signals. The preprocessing circuit amplifies the raw photocurrent signal and converts it into a logic pulse by thresholding, the logic pulse is then input into the timing circuit for timing. The size of a housing 27 of the receiver is exactly the same as that of a laser tracker reflection target ball (SMR) with the diameter of 1.5-inch, and a deviation between a photosensitive center 28 of the receiver and the central position of an SMR cone prism is less than 0.1 mm, which allows accuracy comparisons with the laser tracker or other global navigation coordinates measurement systems. In order to increase anti-jamming capacity of the system, the sensitive wavelength of the photosensitive unit is identical to the laser wavelength from the transmitter, and the output signals from the terminal of the receivers are differential signals.

The present invention also provides a measurement method according to the indoor mobile robot position and posture measurement system based on photoelectric scanning on the basis of the angle measurement method by biplane coaxial rotating scanning. The measurement method mainly comprises a photoelectric scanning transmitter fixed on the mobile robot and the receivers positioned at known points, each receiver is arranged with a computer for coordinate computation. The measurement system adopts the unidirectional broadcasting mode of transmitter-to-receiver broadcast for measuring, and adopts laser transmitter based on the biplane coaxial rotating scanning to broadcast scanning light signals with angle information to the whole space. Furthermore, the position and posture measurement accuracy of the present invention may reach 2 mm.

The precise 3D coordinates of the guiding beacons are required to obtain a high-accuracy position and posture measurement of the mobile robot. The present invention adopts a laser tracker or other precise equipments for precisely measuring the 3D coordinates of the guiding beacons, the accuracy of which is better than 0.03 mm, which may completely meet a millimeter-sized measurement requirements and an arcminute-level posture measurement requirements of the mobile robot.

A measurement method of the indoor mobile robot position and posture measurement system based on photoelectric scanning, including:

Step 1: establishing global navigation coordinate system, precisely measuring the 3D coordinates in global navigation coordinate system by a laser tracker or an indoor GPS;

Step 2: receiving, by each receiver, a scanning laser signal emitted by an infrared laser of the laser transmitter and the synchronous pulse laser signal emitted by the synchronous pulse laser, and sending the signals to each connected signal processor; calculating, by each signal processor, precise coordinates of each connected receiver in laser transmitter coordinate system, including two scanning angles $\theta_{i1}$, $\theta_{i2}$ and the horizontal angle $\alpha_i$ and vertical angle $\beta_i$ of the receiver corresponding to the laser transmitter coordinate system, and storing the results into the terminal computer;

Wherein, two scanning angles $\theta_{i1}$, $\theta_{i2}$, the horizontal angle $\alpha_i$ and vertical angle $\beta_i$ in step 2 are obtained by the following formulae:

$$\theta_{i1} = \omega \cdot t_{i1}$$

$$\theta_{i2} = \omega \cdot t_{i2}$$

$$l_i = n_{i1} \times n_{i2} = (r_{ix} \ r_{iy} \ r_{iz})$$

$$\alpha_i = \arctan\left(\frac{r_{iy}}{r_{ix}}\right)$$

$$\beta_i = \arctan\left(\frac{r_{iz}}{\sqrt{r_{ix}^2 + r_{iy}^2}}\right)$$

Wherein, $\omega$ represents a rotational angular velocity of the rotor of the laser transmitter; $t_{i1}$ and $t_{i2}$ represent the time lengths when the first and second light-plane of the laser transmitter scan the $i^{th}$ receiver, respectively; $n_{i1}$ and $n_{i2}$ represent the normal vectors of the light-planes when the first and second light-plane of the laser transmitter scan the $i^{th}$ receiver, respectively, the cross multiply algorithm results $l_i$ thereof are expressed by ($r_{ix}$ $r_{iy}$, $r_{iz}$);

Step 3: calculating, by the terminal computer, the distance values between the laser transmitter and each receiver according to the precise coordinates of each receiver, respectively;

The distance values, which are calculated in Step 3, between the laser transmitter and each receiver may be obtained by the following formula achieved by arbitrary two receivers:

$$\cos(\theta_{ij}) = \frac{d_i^2 + d_j^2 - L_{ij}^2}{2d_i d_j}$$

If no less than three receivers received the laser signals, three formulae according to the above formula can be obtained, and the number of unknown values is equal to that of the formulae, so that the distances $d_i$ respectively between the transmitter and the three receivers may be calculated, i=1,2,3. Wherein, $\theta_{ij}$ represents an included angle between the laser transmitter and a connecting line of the two receivers i, j, which can be obtained by the following formula:

$$\theta_{ij} = \arccos\left(\frac{l_i \cdot l_j}{|l_i| \cdot |l_j|}\right);$$

Step 4: expressing the approximate coordinates of each receiver in laser transmitter coordinate system as $p_i=d_i(\cos \beta_i \cos \alpha_i, \cos \beta_i \sin \alpha_i, \sin \beta_i)$, and by taking the approximate coordinates as iteration initial value, performing optimal calculation by an Levenberg-Marquardt algorithm to obtain the precise coordinates of each receiver in laser transmitter coordinate system;

Step 5: performing coordinates conversion according to the precise coordinates achieved by step 4 and the 3D coordinates of all the receivers achieved by step 1 to obtain a posture matrix and a translation matrix of the laser transmitter coordinate system corresponding to the global navigation coordinate system;

The posture matrix and the translation matrix in Step 5 may be obtained by:

$$[C_b^n T_b^n] = G \cdot S^T \cdot (S \cdot S^T)^{-1}$$

Wherein, $C_b^n$ represents the posture matrix, $T_b^n$ represents the translation matrix, assuming i receivers receiving the light signals from the laser transmitter; G and S represent the 3D coordinates point matrixes of the receivers in the global navigation coordinate system and the laser transmitter coordinate system, respectively, which can be expressed as:

$$G = \begin{bmatrix} P_1^n & P_2^n & \ldots & P_i^n \\ 1 & 1 & \ldots & 1 \end{bmatrix}$$

$$S = \begin{bmatrix} P_1^b & P_2^b & \ldots & P_i^b \\ 1 & 1 & \ldots & 1 \end{bmatrix}$$

Then the least-square problem is calculated to obtain the final results of $C_b^n$ and $T_b^n$ as follows:

$$\begin{cases} \min F = \sum_{i=1}^{N} \|P_i^n - [C_b^n T_b^n] \cdot P_i^b\|^2 \\ C_b^{nT} C_b^n - I = 0 \end{cases};$$

Step 6: acquiring a posture angle of the mobile robot according to the posture matrix and acquiring a position of the mobile robot according to the translation matrix;

Wherein, the posture angle of the mobile robot is obtained by the posture matrix obtained in Step 5, the formulae are as follows:

$$\psi = \arctan\left(\frac{C_b^n(1,2)}{C_b^n(2,2)}\right)$$

$$\theta = \arctan(C_b^n(3,2))$$

$$\gamma = \arctan\left(-\frac{C_b^n(3,1)}{C_b^n(3,3)}\right)$$

Wherein, $\psi$ represents a heading angle, $\theta$ represents a pitch angle, and $\gamma$ represents a roll angle.

The position of the mobile robot is obtained by the translation matrix directly, the translation matrix $T_b^n$ may be expressed as:

$$T_b^n = (X \ Y \ Z)$$

The components of the translation matrix are the 3D coordinates of the mobile robot in global navigation coordinate system.

Although the functions and working processes of the present invention have been described above with reference to the accompanying drawings, the present invention is not limited thereto. The foregoing specific implementations are merely illustrative but not limiting. A person of ordinary skill in the art may make various forms under the teaching of the present invention without departing from the purpose of the present invention and the protection scope of the appended claims, and all the forms shall fall into the protection scope of the present invention.

What is claimed is:

1. An indoor mobile robot position and posture measurement system based on photoelectric scanning, including a mobile robot (1) which is arranged with a laser transmitter (2), a peripheral of the laser transmitter (2) provided with at least three receivers (3) for receiving light signals emitted by the laser transmitter (2), and at least one signal processor (4) connected to the at least three receivers (3) for processing signals received by the at least three receivers (3) to determine precise coordinates of the at least three receivers in a laser transmitter coordinate system, and a terminal computer (5) wirelessly connected with the at least one signal processor (4) to determine a posture angle and a position of the mobile robot by determining distances between the laser transmitter and each receiver, wherein the measurement method comprises the following steps:

Step 1: establishing &global navigation coordinate system, and measuring 3D coordinates of each receiver in the global navigation coordinate system by a laser tracker or an indoor GPS;

Step 2: receiving, by each receiver, a scanning laser signal emitted by an infrared laser of the laser transmitter and a synchronous pulse laser signal emitted by a synchronous pulse laser, and sending the scanning laser signal and the synchronous pulse laser signal to the at least one signal processor; calculating, by the at least one signal processor, the precise coordinates of each receiver in a laser transmitter coordinate system, including two scanning angles $\theta_{i1}$, $\theta_{i2}$, a horizontal angle $\alpha_i$ and a vertical angle $\beta_i$ of each receiver i corresponding to the laser transmitter coordinate system, and storing the precise coordinates into the terminal computer;

Step 3: calculating, by the terminal computer, the distances between the laser transmitter and each receiver according to the precise coordinates of each receiver, respectively:

Step 4: expressing approximate coordinates of each receiver in the laser transmitter coordinate system as $\rho i = di$ (cos $\beta_i$, cos $\alpha_i$, cos $\beta_i$, sin $\alpha_i$, sin $\beta_i$) taking the approximate coordinates as initial values, and performing an iteration calculation to update the precise coordinates of each receiver in the laser transmitter coordinate system:

Step 5: performing coordinates conversion according to the precise coordinates achieved by step 4 and the 3D coordinates of the at least three receivers achieved by step 1 to obtain a posture matrix and a translation matrix of the laser transmitter coordinate system corresponding to the global navigation coordinate system:

Step 6: acquiring the posture angle of the mobile robot according to the posture matrix and acquiring the position of the mobile robot according to the translation matrix.

2. The indoor mobile robot position and posture measurement system based on photoelectric scanning according to claim 1, wherein each of the at least one signal processor (4) is connected with 3 to 8 receivers.

3. The indoor mobile robot position and posture measurement system based on photoelectric scanning according to claim 1, wherein the two scanning angles $\theta_{i1}$, $\theta_{i2}$, the horizontal angle $\alpha_i$ and the vertical angle $\beta i$ in step 2 are obtained by the following formulae:

$$\theta_{i1} = \omega \cdot t_{i1}$$

$$\theta_{i2} = \omega \cdot t_{i2}$$

$$l_i = n_{i1} \times n_{i2} = (r_{ix} \quad r_{iy} \quad r_{iz})$$

$$\alpha_i = \arctan\left(\frac{r_{iy}}{r_{ix}}\right)$$

$$\beta_i = \arctan\left(\frac{r_{iz}}{\sqrt{r_{ix}^2 + r_{iy}^2}}\right)$$

wherein, $\omega$ represents a rotational angular velocity of a rotor of the laser transmitter; $t_{i1}$ and $t_{i2}$ represent time lengths when a first light-plane and a second light-plane of the laser transmitter scan the $i^{th}$ receiver, respectively; $n_{i1}$ and $n_{i2}$ represent the normal vectors of the first light-plane and the second light-plane when the first light-plane and the second light-plane of the laser transmitter scan the $i^{th}$ receiver, respectively, a cross multiply algorithm result $l_i$ thereof is expressed by $(r_{ix}, r_{iy}, r_{iz})$.

4. The indoor mobile robot position and posture measurement system based on photoelectric scanning according to claim 1, wherein the distances, which are calculated in Step 3, between the laser transmitter and each receiver may be obtained by the following formula achieved by arbitrary two receivers:

$$\cos(\theta_{ij}) = \frac{d_i^2 + d_j^2 - L_{ij}^2}{2 d_i d_j}$$

wherein if no less than three receivers receive the scanning laser signal and the synchronous pulse laser signal, three formulae according to the above formula can be obtained, and a number of unknown values is equal to that of the formulae, so that the distances di respectively between the laser transmitter and the at least three receivers may be calculated, i=1,2,3;

wherein, $\theta_{ij}$ represents an included angle between the laser transmitter and a connecting line between two receivers i, j, which can be obtained by the following formula:

$$\theta_{ij} = \arccos\left(\frac{l_i \cdot l_j}{|l_i| \cdot |l_j|}\right).$$

5. The indoor mobile robot position and posture measurement system based on photoelectric scanning according to claim 1, wherein the posture matrix and the translation matrix in Step 5 may be obtained by:

$$[C_b{}^n T_b{}^n] = G \cdot S^T \cdot (S \cdot S^T)^{-1}$$

wherein, $C_b{}^n$ represents the posture matrix, $T_b{}^n$ represents the translation matrix, assuming i receivers receiving the light signals from the laser transmitter; G and S represent 3D coordinates point matrixes of the at least three receivers in the global navigation coordinate system and the laser transmitter coordinate system, respectively, which can be expressed as:

$$G = \begin{bmatrix} P_1^n & P_2^n & \dots & P_i^n \\ 1 & 1 & \dots & 1 \end{bmatrix}$$

$$S = \begin{bmatrix} P_1^b & P_2^b & \dots & P_i^b \\ 1 & 1 & \dots & 1 \end{bmatrix}$$

wherein a least-square problem is calculated to obtain final results of $C_b{}^n$ and $T_b{}^n$ as follows:

$$\begin{cases} \min F = \sum_{i=1}^{N} \|P_i^n - [C_b^n T_b^n] \cdot P_i^b\|^2 \\ \overline{C_b^n T_b^n - l = 0} \end{cases}.$$

6. The indoor mobile robot position and posture measurement system based on photoelectric scanning according to claim 1, wherein the posture angle of the mobile robot in Step 6 is obtained by the posture matrix obtained in Step 5, the formulae are as follows:

$$\psi = \arctan\left(\frac{C_b^n(1,2)}{C_b^n(2,2)}\right)$$

$$\theta = \arctan(C_b^n(3,2))$$

$$\gamma = \arctan\left(-\frac{C_b^n(3,1)}{C_b^n(3,3)}\right)$$

wherein, $\psi$ represents a heading angle, $\theta$ represents a pitch angle, and $\gamma$ represents a roll angle.

7. The indoor mobile robot position and posture measurement system based on photoelectric scanning according to claim 1, wherein the position of the mobile robot in Step 6 is obtained by the translation matrix directly, the translation matrix $T_b^n$ may be expressed as:

$$T_b^n = (X\ Y\ Z)$$

wherein the components of the translation matrix are the 3D coordinates of the mobile robot in the global navigation coordinate system.

\* \* \* \* \*